(12) United States Patent
Poupyrev et al.

(10) Patent No.: US 8,035,619 B2
(45) Date of Patent: Oct. 11, 2011

(54) IMAGE DRAWING METHOD, PORTABLE TERMINAL, AND COMPUTER PROGRAM

(75) Inventors: Ivan Poupyrev, Tokyo (JP); Karl Darcy Daniel Willis, Tokyo (JP)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 12/135,182

(22) Filed: Jun. 8, 2008

(65) Prior Publication Data

US 2009/0115797 A1     May 7, 2009

(30) Foreign Application Priority Data

Jun. 7, 2007    (JP) ................................ 2007-151146

(51) Int. Cl.
    *G06F 3/02*       (2006.01)
    *G06F 3/033*     (2006.01)
    *G06F 3/14*       (2006.01)

(52) U.S. Cl. ...................... 345/169; 345/179; 715/864

(58) Field of Classification Search .................. 345/169, 345/179; 715/864
See application file for complete search history.

(56) References Cited

U.S. PATENT DOCUMENTS

| | | | | |
|---|---|---|---|---|
| 5,146,049 A | * | 9/1992 | Shima ............................ | 345/173 |
| 5,411,271 A | | 5/1995 | Mirando | |
| 5,603,500 A | * | 2/1997 | Olti et al. ................... | 273/153 R |
| 5,757,361 A | * | 5/1998 | Hirshik ......................... | 345/156 |
| 5,920,303 A | * | 7/1999 | Baker et al. .................... | 345/172 |
| 6,275,232 B1 | | 8/2001 | Cataudella et al. | |
| 2002/0142839 A1 | | 10/2002 | Wolinsky | |
| 2002/0142840 A1 | | 10/2002 | Wolinsky | |
| 2006/0073895 A1 | | 4/2006 | Wolinsky | |
| 2006/0206918 A1 | * | 9/2006 | McLean ........................... | 726/2 |

FOREIGN PATENT DOCUMENTS

| | | |
|---|---|---|
| JP | 1-292398 | 11/1989 |
| JP | 11-305987 | 11/1999 |
| JP | 2002-163069 | 6/2002 |

(Continued)

OTHER PUBLICATIONS

Jun Rekimoto et al., "PreSense Interaction Techniques for Finger Sensing Input Devices", UIST 03. Proceedings of the 16th Annual ACM Symposium on User Interface Software and Technology, Nov. 2-5, 2003, New York, NY, vol. 5, No. 2, pp. 203-212.

(Continued)

*Primary Examiner* — Ulka Chauhan
*Assistant Examiner* — Jeffrey Chow
(74) *Attorney, Agent, or Firm* — Finnegan, Henderson, Farabow, Garrett & Dunner, L.L.P.

(57) ABSTRACT

An image drawing method for drawing an image on an input screen of a portable terminal having input keys arranged in an N×M matrix includes the steps of: determining a size of an input window formed of grid squares arranged in an N×M matrix; determining a position of the input window on the input screen; displaying the input window of the size determined in the input window size determination at the position of the input screen, the position being determined in the input window position determination; and in response to user input being performed on one of the input keys arranged in the N×M matrix, performing a drawing process at the grid square corresponding to the position in the N×M matrix at which the user input has been performed.

15 Claims, 11 Drawing Sheets

FOREIGN PATENT DOCUMENTS

| | | |
|---|---|---|
| JP | 2003-173232 | 6/2003 |
| JP | 2003-256120 | 9/2003 |
| JP | 2004-070912 | 3/2004 |
| JP | 2005-198008 | 7/2005 |
| JP | 2005-252645 | 9/2005 |
| JP | 2006-005773 | 1/2006 |
| JP | 2006-504346 | 2/2006 |
| WO | WO 2004/040803 | 5/2004 |

OTHER PUBLICATIONS

Haruka Kataoka and Takeo Igarashi, "PartNavi-Object Selection by Recursive Screen Partition", Internet Citation, Jan. 1, 2003, pp. 61-62, http://drumsoft.com/hrk/study/partnavi/partnavi.pdf, retrieved on Jul. 2, 2008.

* cited by examiner

100

FIG. 6
FIG. 7
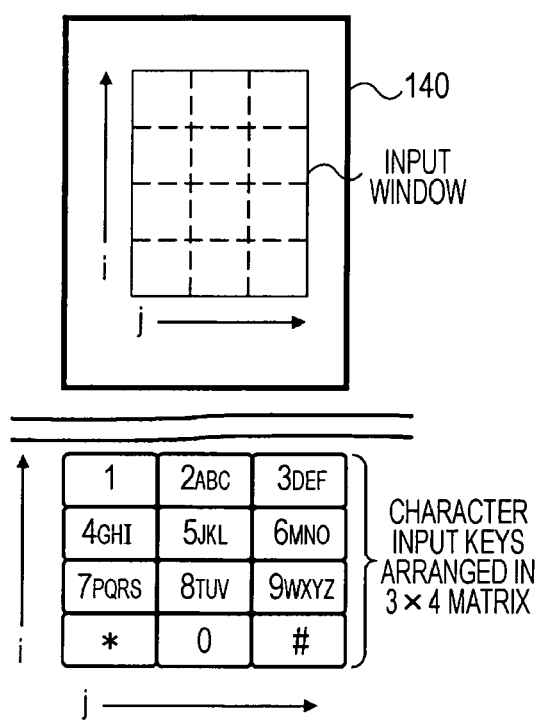
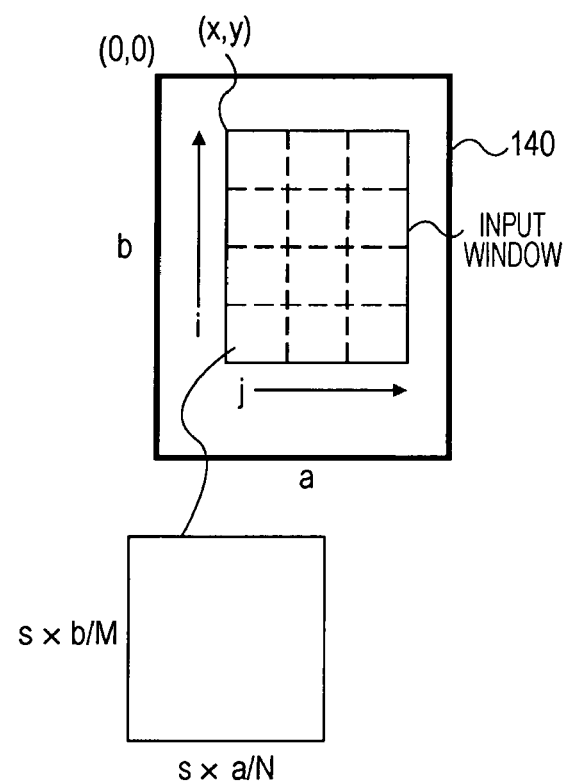

IMAGE DRAWING METHOD, PORTABLE TERMINAL, AND COMPUTER PROGRAM

CROSS REFERENCES TO RELATED APPLICATIONS

The present invention contains subject matter related to Japanese Patent Application JP 2007-151146 filed in the Japanese Patent Office on Jun. 7, 2007, the entire contents of which are incorporated herein by reference.

BACKGROUND OF THE INVENTION

1. Field of the Invention

The present invention relates to an image drawing method for drawing an image on a screen of a portable terminal, such as a mobile phone, to a portable terminal, and to a computer program, and particularly relates to an image drawing method for drawing an image in units of grid squares, such as an ASCII character, a pictogram, or a filled-in grid square, to a portable terminal, and to a computer program.

More particularly, the present invention relates to an image drawing method for drawing an image that substitutes for an illustration by inputting a plurality of characters (including pictograms, and simple filled-in grid squares) within a grid square for several lines on the screen of a portable terminal, to a portable terminal, and to a computer program, and particularly relates to an image drawing method for drawing an image formed of grid squares by using input keys of a mobile phone arranged in an N×M (specifically 3×4) matrix, to a portable terminal, and to a computer program.

In recent years, as information communication technology has become popular, various message exchange systems, such as electronic mail, electronic bulletin boards, and online chat systems, have been available. In this type of message exchange system, one example of a message editing technique is a method of creating a picture by combining characters such as symbols, which are also called "ASCII Art (AA)". In ASCII Art, characters of faces are mainly predominant, but illustrations of landscape paintings and realistic looking paintings are sometimes drawn across several lines. In electronic mail, electronic bulletin boards, and the like, the basic trend is that messages composed of sentences are exchanged on the basis of characters. With ASCII Art, it is possible to provide a visual effect in a plain character display area (see, for example, Japanese Unexamined Patent Application Publication No. 11-305987, Paragraph 0007, FIG. 21).

The usage of ASCII Art started long ago with the advent of "personal computer communication" involving connection via a public line. Thereafter, ASCII Art has rapidly become popular through anonymous electronic bulletin boards and is now often used for signature in electronic mail. Of course, electronic bulletin boards and electronic mail can be accessed by various portable terminals that can be connected to the Internet, including mobile phones. The usage of ASCII Art is widespread in these information devices as well as personal computers.

Here, ASCII is a character code system (well known) in which the Roman alphabet, numerals, and some other symbols are defined. ASCII Art is structured using characters (single-byte character set (SBCS)) that were defined by the code system at its inception. At present, double-byte characters (DBCS), such as Japanese language word characters, Greek characters, Cyrillic characters, and the like, are also used. Double-byte characters can also be used, but ASCII Art excels in the expressive power of illustrations, and the development of ASCII Art is conspicuous in regions where double-byte characters are commonly used as in, above all, Japan.

Formerly, on a personal computer, characters were predominantly displayed using monospaced font, and the form of the character displayed differed depending on the model type and the environment. Therefore, by considering that the proportions of a drawing will be maintained, basically, ASCII Art is drawn using characters that are monospaced font and that are independent of model type. Furthermore, in mobile phones or the like, pictograms common to each mobile phone carrier are provided. Therefore, it is considered that it is possible to draw ASCII Art using pictograms within the same mobile phone carrier (within the service environment in which the same pictogram code system is provided). In the following, for the sake of convenience, a description will be given by including characters outside the ASCII code and images drawn in units of grid squares by the movement of a cursor, such as simple filled-in grid squares, in "ASCII Art".

In the all point addressable (APA) GUI (Graphical User Interface) environment, it is easy to draw a detailed illustration by using a mouse, a touch-pen, or the like and import it as digital data into the system. On the other hand, in the display environment in which only a character-based editing area, such as electronic mail and an electronic bulletin board, is provided, there is no other way but to draw images, such as illustrations, in units of grid squares by using a cursor, as in the case of ASCII Art. Such a situation generally applies to mobile phones that are not equipped with an APA function.

Here, when an image that substitutes for an illustration, such as a landscape painting or a realistic looking painting, is to be edited over several lines in units of grid squares by using a cursor, it is necessary to limitlessly repeat an operation of moving the cursor to a place where contour and shading of a desired picture pattern exist and inputting an appropriate character or color.

For example, on the input screen of a personal computer having a QWERTY-type full keyboard, it is necessary to press a key corresponding to a character used while moving a cursor to a desired grid square position by pressing the up, down, left, and right cursor keys. In the GUI environment, an operation of moving the cursor can be performed using a pointing device, such as, for example, a mouse, and the operation burden is reduced somewhat.

As has already been described, an illustration formed of grid squares like an ASCII Art illustration is demanded also in a portable terminal, such as a mobile phone, with which message exchange is performed via the Internet. Usually, a mobile phone has, as an input device, character input keys arranged in a 3×4 matrix for inputting Kana characters and alphanumeric characters, and a five-input directional key formed of up, down, left, and right directional keys and a center set key. An editing operation needs to be performed by repeatedly pressing these keys, and even if both hands are freely used, the operation burden becomes a problem.

A drawing method has been proposed (see, for example, Japanese Unexamined Patent Application Publication No. 1-292398) in which, for example, in a drawing method of drawing in units of grid squares by using a cursor, a small coordinate screen (another window) that is displayed by computing the relative position of the current cursor in units of grid squares is provided within the screen. Drawing can be performed in units of grid squares by referring to the number-of-dots information at the position of the current cursor displayed on the small coordinate screen by using a mouse cursor or the like. According to this drawing method, it is possible to draw a fine image by adjusting a cursor to a precise dot position. However, the presupposition is that a multiwindow system is used. Furthermore, the input operation is not simplified unless a device for directly indicating the coordinates of a mouse or the like is equipped. Therefore, it is considered that it is difficult to apply the drawing method to a mobile phone or the like.

Furthermore, software for generating ASCII Art from an image file has been developed. There is a high demand for a processor having sufficient processing performance to execute the software, an operating system that provides the execution environment, a high storage capacity of the system, and the like. Thus, it is difficult to apply the software to an embedded device.

SUMMARY OF THE INVENTION

It is desirable to provide a superior image drawing method for suitably drawing an image on the screen of a portable terminal, such as a mobile phone, a superior portable terminal, and a superior computer program.

It is desirable to provide a superior image drawing method for suitably drawing an image, such as an illustration, in units of grid squares, such as ASCII characters, pictograms, and filled-in grid squares, a superior portable terminal, and a superior computer program.

It is desirable to provide a superior image drawing method for suitably drawing an image that substitutes for an illustration by inputting a plurality of characters (including pictograms, and simple filled-in grid squares) over grid squares for several lines on the screen of a portable terminal, a superior portable terminal, and a superior computer program.

It is desirable to provide a superior image drawing method for suitably drawing an image formed of grid squares by using input keys of a mobile phone arranged in an N×M (specifically 3×4) matrix, a superior portable terminal, and a superior computer program.

According to an embodiment of the present invention, there is provided an image drawing method for drawing an image on an input screen of a portable terminal having input keys arranged in an N×M matrix, the image drawing method including the steps of: determining a size of an input window formed of grid squares arranged in an N×M matrix; determining a position of the input window on the input screen; displaying the input window of the size determined in the input window size determination at the position of the input screen, the position being determined in the input window position determination; and in response to user input being performed on one of the input keys arranged in the N×M matrix, performing a drawing process at a grid square corresponding to a position in the N×M matrix at which the user input has been performed.

Drawing style of drawing an image, such as an illustration of a landscape painting and a realistic looking painting, in units of grid squares by using a cursor, including ASCII Art, has been known, and visual effects can be given to a plain character display area. For example, in a character-based editing environment as in electronic mail and electronic bulletin boards and in mobile phones that are not equipped with an APA function, it is considered that there is a demand for an image drawing method based on grid squares using a cursor. However, the mobile phone has only limited input keys, and the burden on the operation of filling in desired grid squares with characters or the like while scanning the entire screen is large.

An image drawing method according to an embodiment of the present invention can be applied to, for example, a mobile phone having character input keys formed of the N×M matrix. When an input window formed of grid squares of the N×M matrix is displayed on the input screen and one of the character input keys is pressed, a drawing process is performed on the grid square corresponding to the position in the N×M matrix at which the key input has been performed.

That is, in the image drawing method according to an embodiment of the present invention, the place where the input window is placed is an area in which drawing is possible at present. It is possible to perform drawing in units of grid squares by using character input keys of the N×M matrix while moving this input window on the input screen.

Here, an ordinary mobile phone has character input keys of the N×M (typically 3×4) matrix, and a directional key including up, down, left, and right direction buttons and a set button in the center. An interaction method is possible in which, by using these input keys, each time, for example, the set key among the directional keys is pressed, the size of the input window is switched cyclically at a fixed ratio and also, each time one of the up, down, left, and right button among the directional keys is pressed, the input window is moved to the corresponding direction on the input screen while the pixel size of each grid square is maintained. When the input window is to be moved, the pixel size of each grid square is maintained.

The user determines the size of the input window while considering the fineness and granularity of an image, such as an illustration, to be drawn by using directional keys including up, down, left, and right direction buttons and a set button in the center, and then moves the input window to a place where the contour and shading of a picture pattern exist. Then, by using the character input keys of the N×M matrix, it is possible to indicate and input drawing content of each grid square.

As described above, according to the image drawing method according to the embodiment of the present invention, by only utilizing as is a simple input key configuration with which a mobile phone is usually equipped, it is possible for the user to perform a drawing process in units of grid squares. The drawing operation performed by the user is basically a repetition of key input operations similarly to the related art. It should be fully understood that a flexible and simple operation environment is provided by the combination of the specification of the granularity of an image using an input window size, and intuitive indication and input of each grid square within the input window using the character input keys arranged in an N×M matrix.

When a user presses one of the character input keys of the N×M matrix, in the input window drawing, a drawing process corresponding to current image information of the grid square at the corresponding position in the N×M matrix is applied.

More specifically, when the input screen has a drawing color and a background color, in the input window drawing, if the grid square corresponding to the position in the N×M matrix at which the user input has been performed currently has the background color at present, the grid is redrawn in the drawing color. Conversely, if the grid square currently has the drawing color, the grid is redrawn in the background color.

Alternatively, when the input screen has a drawing color with a high intensity and a background color with a low intensity, in the input window drawing, if the grid square corresponding to the position in the N×M matrix at which the user input has been performed currently has the background color, the intensity may be increased by a specific ratio. Conversely, if the grid square currently has the drawing color, the intensity may be decreased by a specific ratio.

Furthermore, in response to a user operation of a specific key assigned to mode switching or a simultaneous operation of two or more keys having a specific combination, the drawing process method applied in the input window drawing may be changed. Examples of changing the drawing process method referred to herein include changing of colors used for the drawing color and the background color. Alternatively, when multi-tap such that a directional key is pressed after a character input key is pressed is performed, lines of grid squares may be drawn.

Up to this point, as a drawing process in units of grid squares according to the image drawing method according to the embodiment of the present invention, an example in which a grid square at a position corresponding to the character input key is filled in with a predetermined drawing color has been given. Of course, it is possible to apply the image drawing method to that in which an illustration is drawn by arranging a character font in a grid square where key input has been performed as in ASCII Art.

In such a case, first, a character or a pictogram is assigned to each of the input keys. For example, a character or a pictogram can be made to be selected from a plurality of them used for drawing, such as an illustration, via a predetermined menu screen. Then, in the input window size determination, the size of the input window in which each grid square is formed at a pixel size corresponding to a character or a pictogram is determined. At this time, it is assumed that the size of the grid square is fixed to one character size and that even if a set input among the directional keys is performed, the size will not be changed. Then, in the input window drawing, in response to a user input being performed on one of input keys of the N×M matrix, a character or a pictogram assigned to the input key at which the user input has been performed is drawn on the grid square corresponding to the position in the N×M matrix at which the user input has been performed.

As a result of arranging a character font and pictograms over several lines of the input screen by repeating such a character drawing process in units of grid squares, it is possible to draw an image that substitutes for an illustration, such as a landscape painting and a realistic looking painting. By using, as such characters used to draw an illustration, characters having a low dependence on the model type, such as ASCII code and pictograms provided by a mobile phone carrier, the characters can also be used as a message in a message exchange system, such as electronic mail and an electronic bulletin board.

According to another embodiment of the present invention, there is provided a computer program written in a computer-readable format so as to cause a computer to perform a process for drawing an image on an input screen of a portable terminal having input keys arranged in an N×M matrix, the process including the steps of: determining a size of an input window formed of grid squares arranged in an N×M matrix; determining a position of the input window on the input screen; displaying the input window of the size determined in the input window size determination at the position of the input screen, the position being determined in the input window position determination; and in response to user input being performed on one of the input keys arranged in the N×M matrix, performing a drawing process at the grid square corresponding to the position in the N×M matrix at which the user input has been performed.

The computer program according to the embodiment of the present invention is such that a computer program written in a computer-readable format so as to cause a computer to implement predetermined processing is defined. In other words, by installing a computer program according to the embodiment of the present invention into a computer, coordinated operation is exhibited in the computer, and opera-tional advantages similar to those of the image drawing method according to the embodiment of the present invention can be obtained.

According to the embodiments of the present invention, it is possible to provide a superior image drawing method for suitably drawing an image, such as an illustration, in units of grid squares, such as ASCII characters, pictograms, and filled-in grid squares, a superior portable terminal, and a superior computer program.

According to the embodiments of the present invention, it is possible to provide a superior image drawing method for suitably drawing an image that substitutes for an illustration by inputting a plurality of characters (including pictograms, and simple filled-in grid squares) over grid squares for several lines on the screen of a portable terminal, a superior portable terminal, and a superior computer program.

According to the embodiments of the present invention, it is possible to provide a superior image drawing method for suitably drawing an image formed of grid squares by using input keys of a mobile phone arranged in an N×M (specifically 3×4) matrix, a superior portable terminal, and a superior computer program.

BRIEF DESCRIPTION OF THE DRAWINGS

FIG. 6 shows the definition of key positions in an input key group and a grid square position (i, j) in an input window;

FIG. 7 illustrates an input window movement process performed in step S4 in the flowchart shown in FIG. 4;

DESCRIPTION OF THE PREFERRED EMBODIMENTS

Embodiments of the present invention will now be described below with reference to the drawings.

Figure 1:
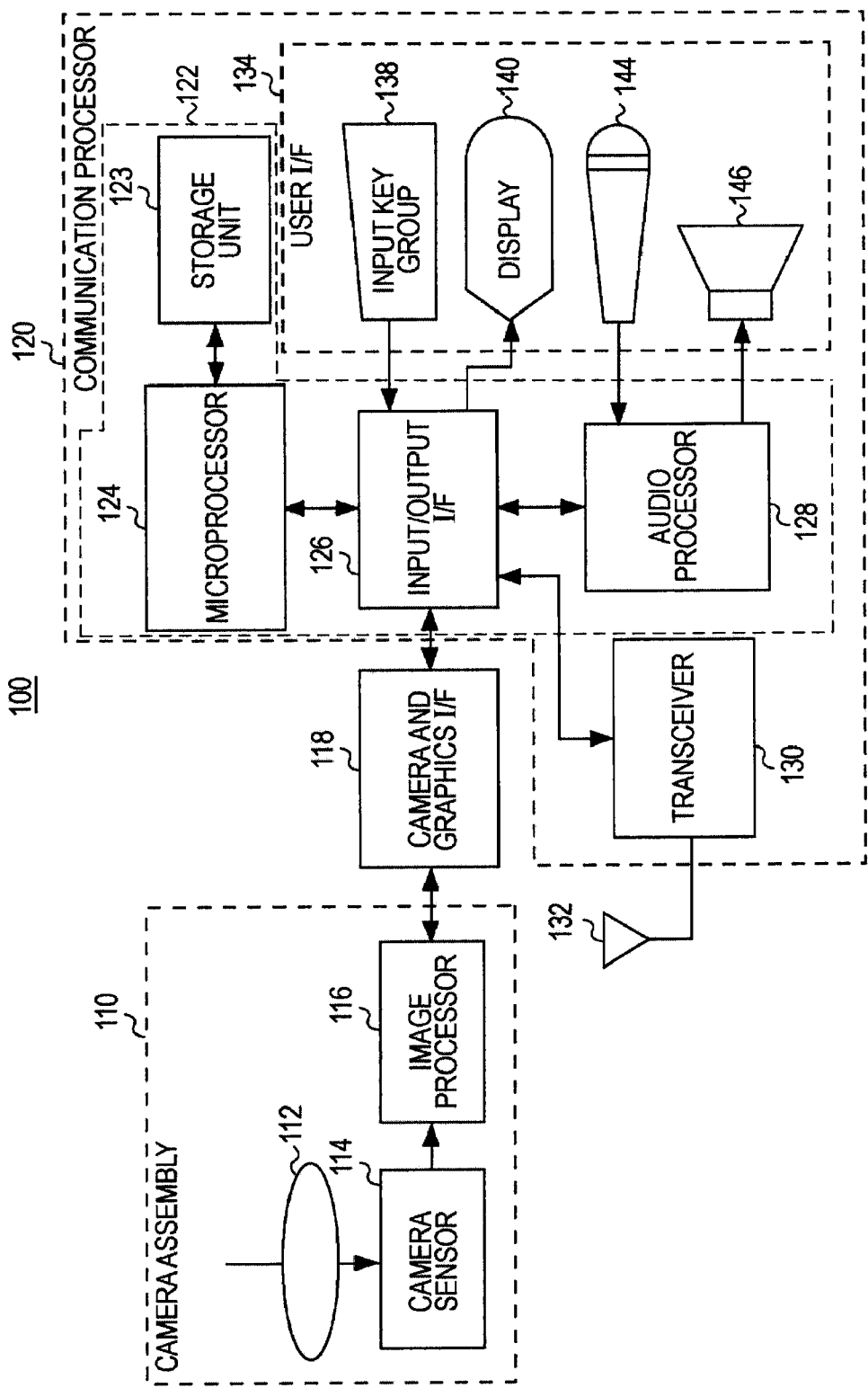
FIG. 1 schematically shows the hardware configuration of a mobile phone 100 according to an embodiment of the present invention.

FIG. 1 schematically shows the hardware configuration of a mobile phone 100 according to an embodiment of the present invention. The mobile phone 100 shown in FIG. 1 has installed a digital camera therein. It should be understood that the spirit and scope of the present invention is not limited to a mobile phone with a camera. However, when the present invention is applied to a mobile phone with a camera, an image drawing process (to be described later) is performed on a photograph image captured using the digital camera, and an image that substitutes for a photograph can be drawn. Furthermore, in addition to a mobile phone, the present invention can be applied to a portable terminal such as a PDA (Personal Digital Assistant), a personal computer, or other information devices.

The mobile phone 100 shown in FIG. 1 includes a camera assembly 110, a camera and graphics interface 118, and a communication processor 120. Each section of the mobile phone 100 will be described below.

The camera assembly 110 includes an optical system 112, an image sensor 114, and an image processor 116. The optical system 112 is constituted by a single lens or a plurality of lenses, and the image sensor 114 receives an image formed by the optical system 112. The image processor 116 processes the raw image data received by the image sensor 114 for the purpose of storage and management in a storage unit 123 (to be described later), for the purpose of output to a display 140, or for the purpose of transmission by the communication processor 120. The image processor 116 is connected to the communication processor 120 via the camera and graphics interface 118.

The communication processor 120 includes a microprocessor 124, a storage unit 123, an input/output interface 126, an audio processor 128, a transceiver 130, an antenna 132, and a user interface 134.

The microprocessor 124 centrally controls the entire operation of the mobile phone 100 with a camera in accordance with predetermined program code. The program code referred to herein includes various kinds of GUI applications in the mobile phone. An example thereof is a drawing application of drawing an image, such as an illustration of a landscape painting and a realistic looking painting, in units of grid squares, and the details thereof will be described later.

The storage unit 123 represents the entire memory space of the apparatus and can include both a random access memory (RAM) and a reading only memory (ROM), and a non-volatile memory, such as an EPROM, an EEPROM, and a flash memory. Computer program commands and data necessary for operations are stored and managed in a non-volatile memory such as an EPROM, an EEPROM, and a flash memory.

The input/output interface 126 allows the microprocessor 124 to be connected to the image processor 116 of the camera assembly 110 via the camera and graphics interface 118. Furthermore, the camera and graphics interface 118 allows the image processor 116 to be connected to the user interface 134. The camera and graphics interface 118 can also be incorporated into the input/output interface 126. Furthermore, the input/output interface 126 allows the microprocessor 124 inside the communication processor 120 to be connected to the transceiver 130, the audio processor 128, and the user interface 134.

The user interface 134 includes an input key group 138, a display 140, a microphone 144, and a speaker 146.

Figure 2:
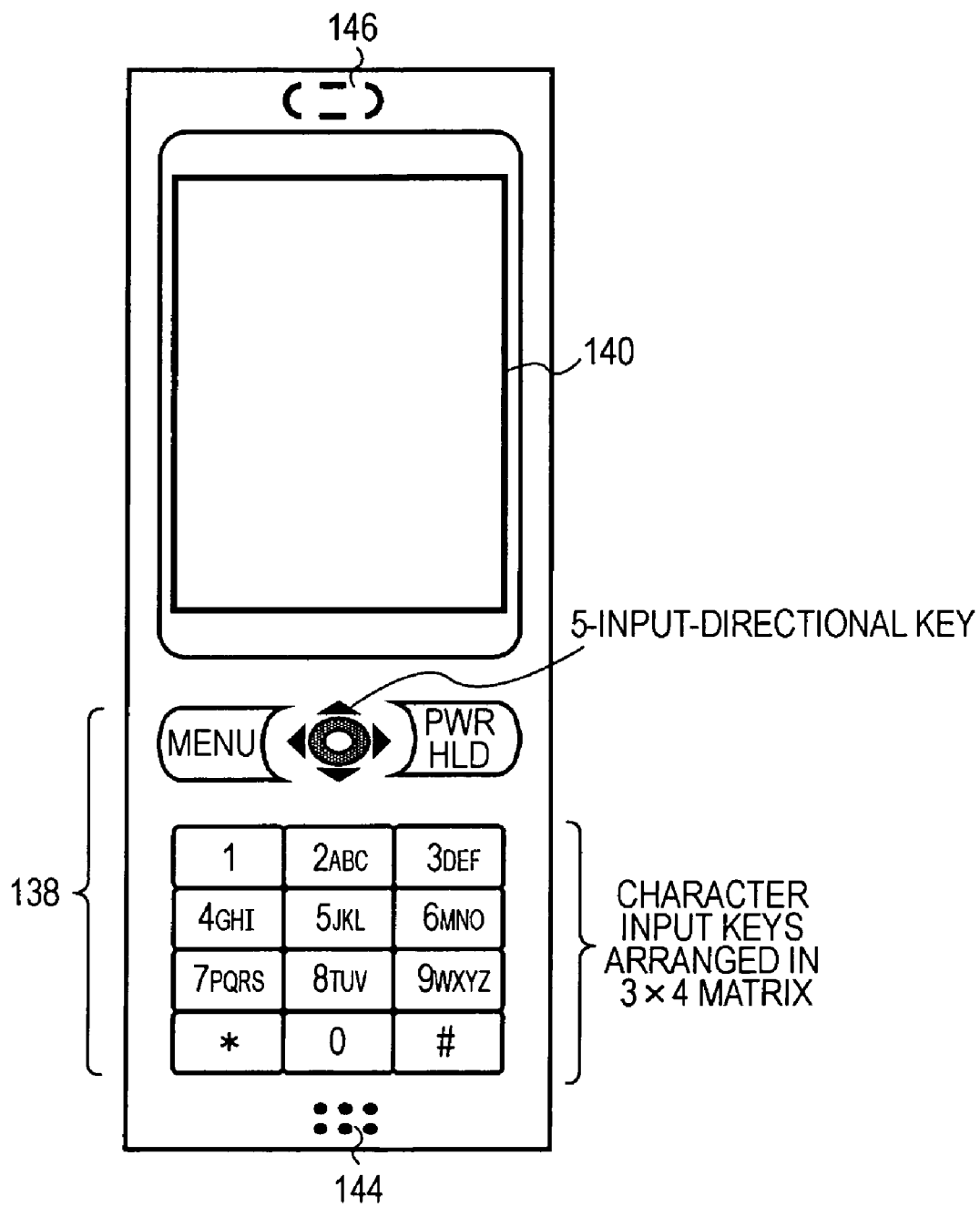
FIG. 2 shows an example of the configuration of the front-side unit of the mobile phone 100.

The input key group 138 and the display 140 are arranged, for example, on the front side of the mobile phone 100. FIG. 2 shows an example of the configuration of the front-side unit of the mobile phone 100. As shown in FIG. 2, the input key group 138 is disposed below the display 140.

The input key group 138 includes character input keys arranged in a 3×4 matrix for inputting Kana characters and alphanumeric characters, a five-input directional key for performing five kinds of inputs of up, down, left, and right, and set, a menu button, and a power (PWR)/hold (HLD) button. The five-input directional key can be configured using, for example, a joystick control button which is well known in the art. When used as an ordinary mobile phone, the 3×4 character input keys and the five-input directional key enable an operator to dial a number, to input a command, and to select an option. In this embodiment, the input key group 138 is used for an operation of moving an input window on the input screen and for an operation of specifying within the input window the position of the grid square where drawing is to be performed when drawing an image, such as an illustration (to be described later).

When used as an ordinary mobile phone, the display 140 enables numerals dialed by an operator, an image, the calling state, the menu option, and other service information to be viewed. In this embodiment, the display 140 is also used as an input screen for drawing an image, such as an illustration, in units of grid squares (to be described later).

The microphone 144 converts the voice of the user into an electrical audio signal, and the speaker 146 converts the electrical audio signal into an audible sound that can be listened to by the user. The audio processor 128 supplies a basic analog output signal to the speaker 146 and receives analog audio input from the microphone 144.

The transceiver 130 is coupled to the antenna 132 for the purpose of reception and transmission of signals, and can operate, as a fully functional cellular radio transceiver, in accordance with any desired known standard including, for example, a standard called GSM (Global System for Mobile Communications), TIA/EIA-136, cdmaOne, cdma2000, UMTS, and Wideband CDMA.

The microprocessor 124, the input/output interface 126, the audio processor 128, and the storage unit 123 can be manufactured by being embedded into, for example, a single-application-specific integrated circuit (ASIC) 122.

For example, an Internet connection service for mobile phones has already become widely popular as this is typified by i-mode, and there are many chances in which the user uses message exchange systems, such as electronic mail and an electronic bulletin board through a user interface provided in the mobile phone. In these message exchange systems, a character-based editing environment, in other words, input operation in units of grid squares using a cursor, is standard.

On the other hand, a method of drawing an image, such as an illustration, such as a landscape painting and a realistic looking painting, in units of grid squares by using a cursor, including ASCII Art, has been known, and it is possible to give a visual effect in a plain character display area. The mobile phone has only limited input keys as described above, and if desired grid squares can be filled in with characters or the like while scanning a cursor over the entire screen, however, the editing operation burden is large.

Accordingly, in this embodiment, a method in which an operation of drawing an image in units of grid squares by using 3×4 character input keys and a five-input directional key that are standard in a mobile phone or the like is performed flexibly and simply is proposed. More specifically, an input window formed of grid squares arranged in a 3×4 matrix is displayed on the input screen. When one of the character input keys is pressed, a drawing process is performed on the grid square corresponding to the position in the 3×4 matrix at which key input has been performed.

Here, an interaction method is possible in which each time the set key in the center of the five-input directional key is pressed, the input window size is switched (cyclically at a fixed ratio) and also, each time one of the up, down, left, and right keys within the directional key is pressed, the input window is moved in the corresponding direction within the input screen while maintaining the pixel size of each grid square. When the input window is to be moved, the pixel size of each grid square is maintained.

The user determines the size of the input window while considering the fineness or granularity of an image, such as an illustration, to be drawn by using directional keys including up, down, left, and right direction buttons and a set button in the center, and then moves the input window to a place where contour and shading of a picture pattern exist. Then, by using character input keys arranged in a 3×4 matrix, it is possible to indicate and input drawing content of each grid square.

The above-described image drawing method in units of grid squares can be implemented in a form in which, for example, a predetermined drawing application is executed by the microprocessor 124.

FIGS. 3A, 3B, 3C, and 3D show, as an example, a state in which image drawing operation in units of grid squares is performed using 3×4 character input keys and a five-input directional key.

Figure 3A:
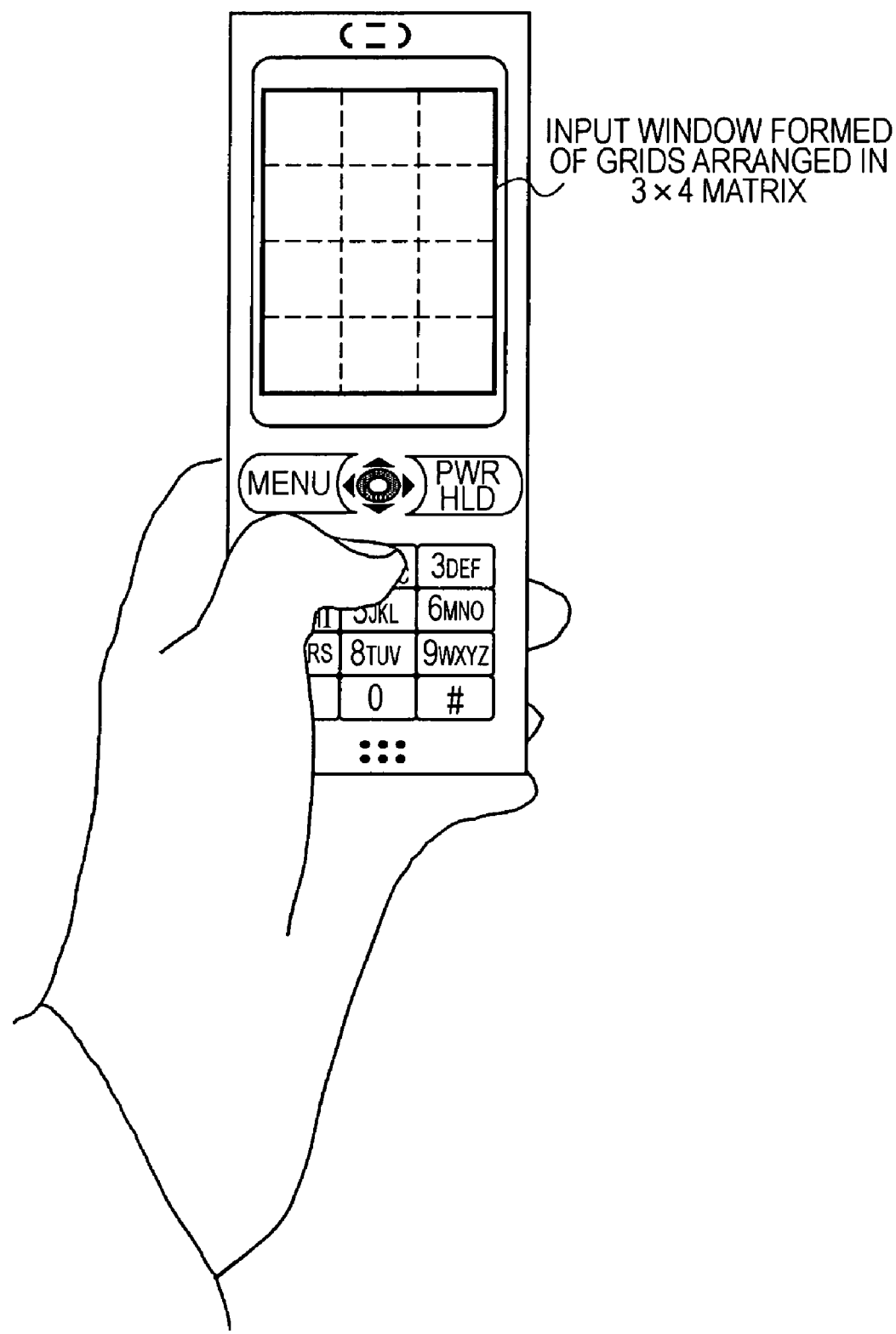
FIG. 3A shows, as an example, a state in which an operation of drawing an image in units of grid squares is performed by using 3×4 character input keys and a five-input directional key.
Figure 3D:
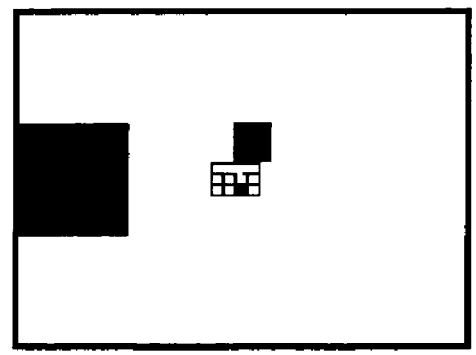
FIG. 3D shows, as an example, a state in which an operation of drawing an image in units of grid squares is performed by using 3×4 character input keys and a five-input directional key.
Figure 3C:
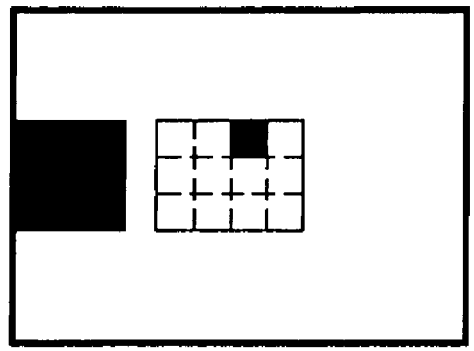
FIG. 3C shows, as an example, a state in which an operation of drawing an image in units of grid squares is performed by using 3×4 character input keys and a five-input directional key.
Figure 3B:
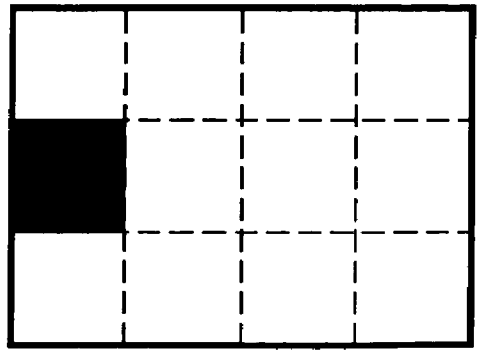
FIG. 3B shows, as an example, a state in which an operation of drawing an image in units of grid squares is performed by using 3×4 character input keys and a five-input directional key.

In FIG. 3A, the size of the input window is set to be the same as that of the entire screen of the display 140, and an input window such that the screen is divided into 3×4 grid squares is displayed. In this state, when the key corresponding to numeral "2", that is, the key of the first line and the second column of the 3×4 matrix, is pressed, as shown in FIG. 3B, the grid square of the first line and the second column within the input window formed of grid squares of the 3×4 matrix is filled in by a predetermined drawing process.

Here, when the set key in the center within the five-input directional key is pressed, the input window is degenerated at a predetermined ratio with respect to the entire screen of the display 140, and as a result, each grid square within the input window is also degenerated. The input window is the current drawable area. When the input window is smaller than the screen of the display 140, by pressing each of the up, down, left, and right directional keys within the five-input directional key, it is possible to move the input window, that is, the drawing area, in the desired direction. As shown in FIG. 3C, when the key corresponding to numeral "9", that is, the key of the third line and the third column of the 3×4 matrix, is pressed, the grid square of the third line and the third column within the degenerated input window formed of grid squares of the 3×4 matrix is shown by a predetermined drawing process.

Furthermore, when the set key in the center within the five-input directional key is pressed, the input window is further degenerated at a predetermined ratio with respect to the immediately previous input window (or the screen size), and in consequence, each grid square within the input window is uniformly degenerated. The input window is the current drawable area. When the input window is smaller than the screen of the display 140, by pressing each of the up, down, left, and right directional keys within the five-input directional key, it is possible to move the input window, that is, the drawing area, in a desired direction. As shown in FIG. 3D, when a key corresponding to numeral "7", that is, the key of the third line and the first column of the 3×4 matrix, is pressed, the grid square of the third line and the first column within the degenerated input window formed of grid squares of the 3×4 matrix is filled in by a predetermined drawing process.

Figure 4:
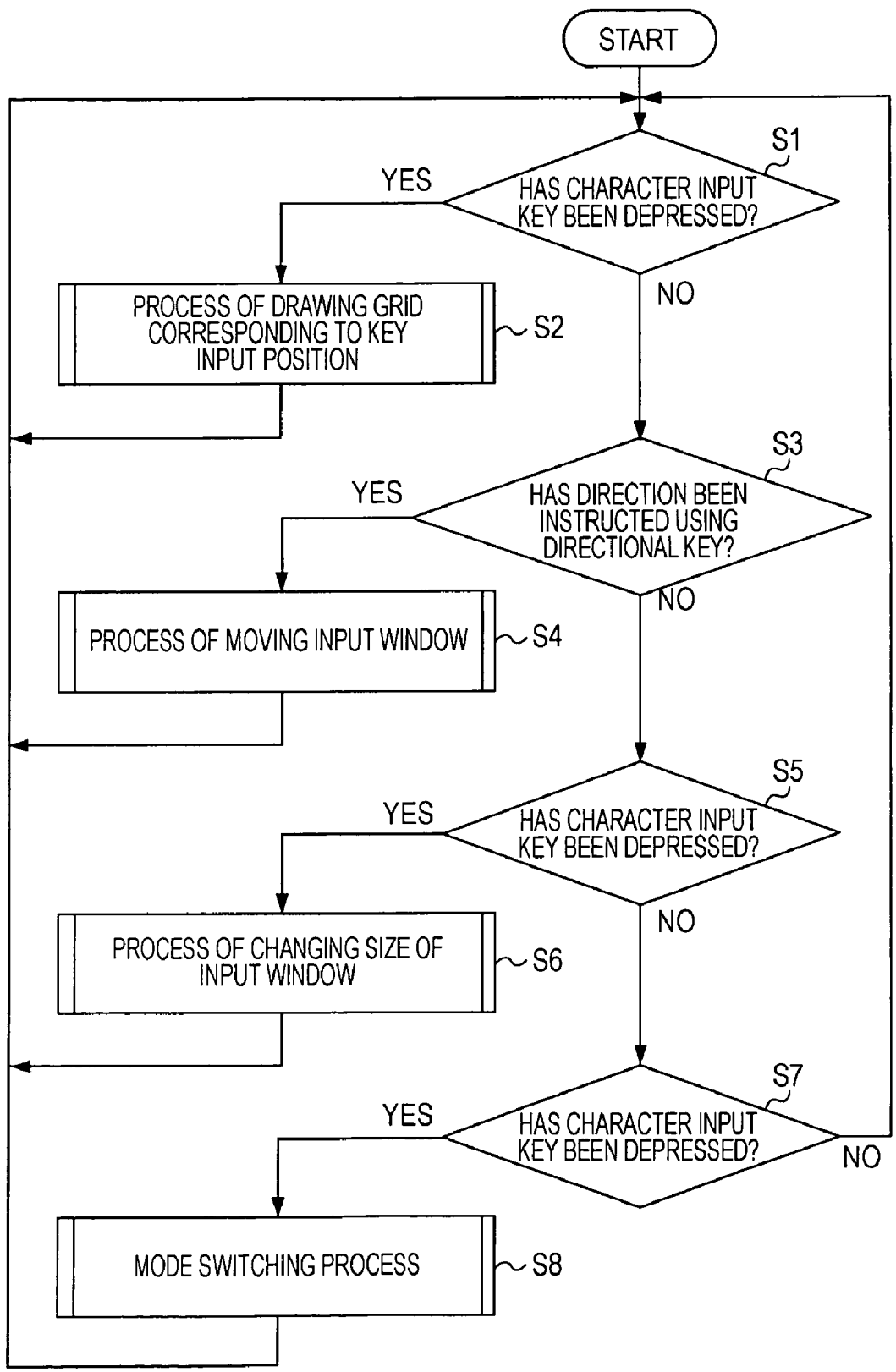
FIG. 4 is a flowchart showing a general processing procedure for performing image drawing in units of grid squares.

FIG. 4 shows, in a flowchart, a general processing procedure for performing the above-described image drawing in units of grid squares. The processing procedure is implemented by a form in which, for example, the microprocessor 124 executes a predetermined drawing application. The processing procedure is started up, for example, as an event process in response to a key input.

When one of the character input keys of the 3×4 matrix is pressed (Yes in step S1), the grid square at a position corresponding to the input key within the current input window formed of grid squares of the 3×4 matrix is filled in by a predetermined drawing process (step S2). The grid square drawing process is defined separately, and the details will be described later.

Furthermore, when the key pressed is not any of the character input keys (No in step S1), next, it is checked whether or not the direction has been indicated using the five-input directional key (step S3). Then, when the direction has been indicated, the input window is moved by a predetermined amount in the indicated direction (step S4). The process for moving the input window is defined separately, and the details thereof will be described later.

Furthermore, when the key pressed is such that a direction is not instructed using the five-input directional key, it is checked whether or not the set key in the center within the five-input directional key has been pressed (step S5). Since the pressing operation of the set key corresponds to an instruction of changing the size of the input window, a process for changing the size of the input window is started up (step S6). The process for changing the size of the input window is defined separately, and the details thereof will be described later.

Furthermore, when the key input is neither an operation of pressing the set key (No in step S5), it is checked whether or not the mode switching key has been pressed (step S7). For the mode switching key, for example, the key adjacent to the left of the five-input directional key can be used. When the mode switching key has been pressed (Yes in step S7), the drawing process method to be applied is switched according to the pressing operation of the character input key (step S8).

Figure 5:
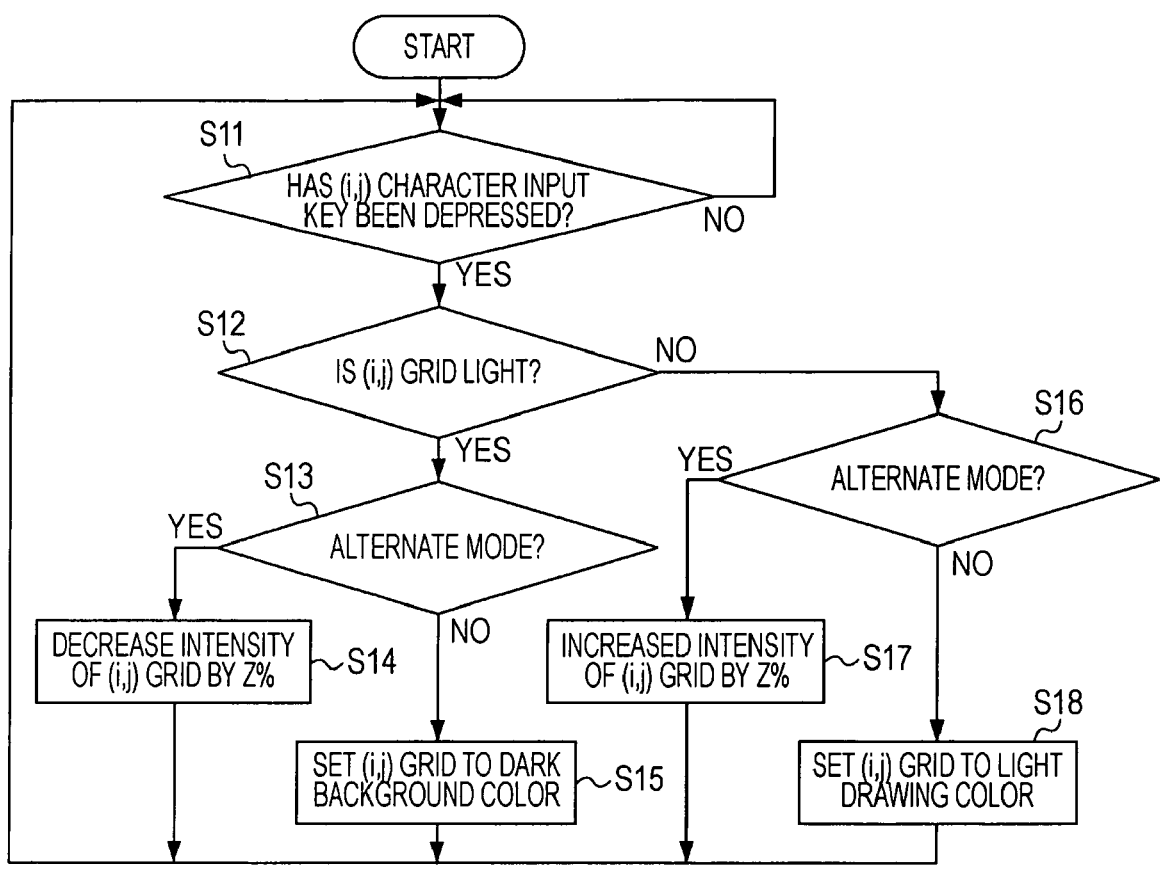
FIG. 5 is a flowchart showing a detailed processing procedure in a drawing process performed in step S2 in the flowchart shown in FIG. 4.

FIG. 5 shows, in a flowchart, a detailed processing procedure in a drawing process performed in step S2 in the flowchart shown in FIG. 4.

In the following description, when character input keys (or a key group for specifying the position of a grid square to be drawn) are arranged in an N×M matrix (where N=3, M=4), it is assumed that descriptions of grid squares of N×M matrix constituting the input window are all equal and that the key position in the input key group and the grid square position (i, j) in the input window are defined, as shown in FIG. 6 (where i is an integer from 1 to M, and j is an integer from 1 to N). Furthermore, as a method of drawing each grid square, a light drawing color and a dark background color are available, and the light intensity is assumed to be capable of being changed in a step-like manner by mode switching (described above).

When a key at a position (i, j) from within the input key group is pressed (Yes in step S11), it is checked whether or not the grid square at the position (i, j) within the input window is currently light (step S12).

At this point, when the grid square position (i, j) within the input window is currently light (Yes in step S12), it is further checked whether or not the current drawing mode is an alternative mode (step S13). Then, in the case of the alternate mode (Yes in step S13), the intensity of the grid square is decreased by z % (step S14). In the case of another mode (No in step S13), the grid square is inverted to a dark background color (step S15).

Furthermore, when the grid square at the position (i, j) within the input window is currently dark (No in step S12), it is further checked whether or not the current drawing mode is an alternative mode (step S16). Then, in the case of the alternate mode (Yes in step S16), the intensity of the grid square is increased by z % (step S17), and in the case of another mode (No in step S16), the grid square is inverted into a light drawing color (step S18).

FIG. 7 shows an input window movement process performed in step S4 in the flowchart shown in FIG. 4.

In FIG. 7, the input window on the screen of the display 140 has a horizontal size a and a vertical size b. The origin (0, 0) is defined at the upper left of the screen, and the position at the upper left of the input window is represented by an xy coordinate system.

When the input window is to be moved, the current size is maintained. Here, the scale factor is set as s, and by changing the scale factor s, the size of the input window is changed. The horizontal size of the grid square is s×a/N, and the vertical size of the grid square is s×b/M.

When the scale factor is to be changed in a decreasing direction, the number of sizes that the input window can be changed to is determined. When a scale change instruction is input, the sizes are cycled through, and the size is changed. For example, when the number of sizes that the input window can be changed to, is set to 3, the scale factor s is any of 1, ⅔, and ⅓ (with respect to the entire screen), and these values are cycled through in response to the input of the scale change instruction.

Furthermore, a variable n_size is used to define the number of sizes that the input window can be changed to.

Figure 8:
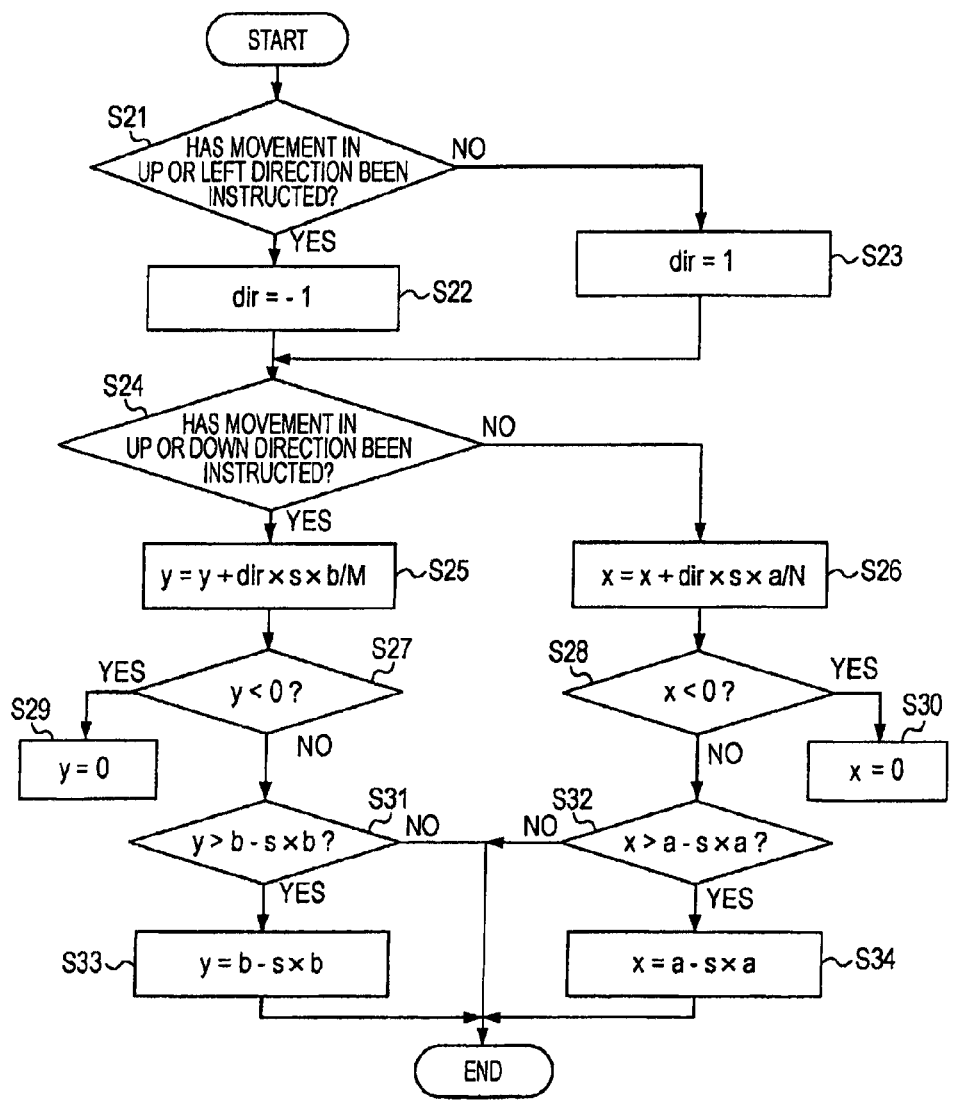
FIG. 8 is a flowchart showing a detailed processing procedure in the input window movement process performed in step S4 in the flowchart shown in FIG. 4.

FIG. 8 shows, in a flowchart, a detailed processing procedure in the input window movement process performed in step S4 in the flowchart shown in FIG. 4. In the following description, when the movement of the input window is instructed, the input window is assumed to be moved by an amount corresponding to one grid square (that is, by s×a/N in the horizontal direction or by s×b/M in the vertical direction) in the specified direction.

In step S3, when a movement in the up or left direction is instructed via the five-input directional key (Yes in step S21), −1 is substituted for a variable dir (step S22). Otherwise, 1 is substituted for the variable dir (step S23).

Next, it is checked whether or not a movement in the up or down direction has been instructed via the five-input directional key in step S3 (step S24).

When the movement in the up or down direction has been instructed in step S3 (Yes in step S24), the position is updated to y+dir×s×b/M at the y coordinate of the input window (step S25). Next, it is checked whether or not the y coordinate of the input window is less than 0 (step S27). When the y coordinate is less than 0 (Yes in step S27), 0 is substituted for y (step S29). Furthermore, when the y coordinate does not become less than 0 even if the y coordinate of the input window is updated in step S25 (No in step S27), it is further checked whether or not the y coordinate after the input window has been updated exceeds b−s×b, that is, whether or not the lower end of the input window has reached the lower end of the display area of the display (step S31). Then, when the y coordinate after the input window has been updated exceeds b−s×b, b−s×b is substituted for the y coordinate (step S33).

In step S23, when the movement in the up or down direction has not been instructed (No in step S24), the position is updated to x+dir×s×a/N at the x coordinate of the input window (step S26). Next, it is checked whether or not the x coordinate of the input window is less than 0 (step S28). When the x coordinate is less than 0 (Yes in step S28), 0 is substituted for x (step S30). Furthermore, when the x coordinate of the input window does not become less than 0 even if the x coordinate is updated in step S26 (No in step S30), it is further checked whether or not the updated x coordinate of the input window exceeds a−s×a, that is, whether or not the right end of the input window has reached the right end of the display area of the display (step S32). Then, when the updated x coordinate of the input window exceeds a−s×a, a−s×a is substituted for the x coordinate (step S34).

Figure 9:
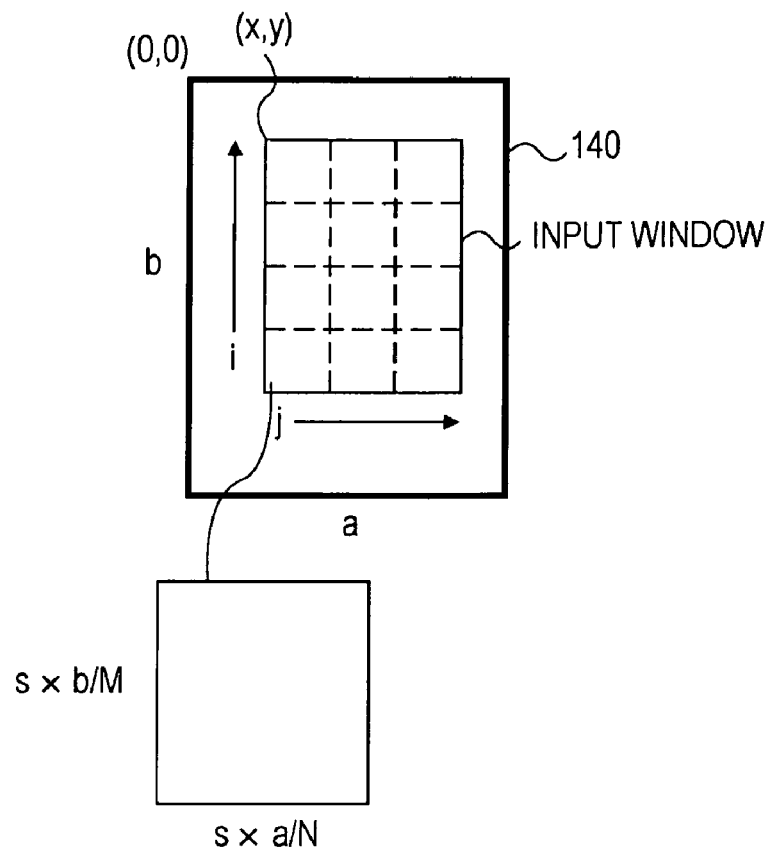
FIG. 9 illustrates an input window size change process performed in step S6 in the flowchart shown in FIG. 4.

FIG. 9 shows an input window size change process performed in step S6 in the flowchart shown in FIG. 4.

In FIG. 9, the input window is formed of grid squares of an N×M matrix. Here, N is the number of grid squares in the horizontal direction, and M is the number of grid squares in the vertical direction. In this embodiment, N=3 and M=4 (same as above).

Here, the scale factor is set as s, and by changing the scale factor s, the size of the input window is changed. When the scale factor s is to be changed in a decreasing direction, the number of sizes that the input window can be changed to is determined. When a scale change instruction is input, the sizes are cycled through and changed. For example, when the number of sizes that the input window can be changed to is set to 3, the scale factor s is any of 1, ⅔, or ⅓ (with respect to the entire screen), and these values are cycled through according to the input of the scale change instruction. The variable n_size is used to define the number of sizes that the input window can be changed to.

Figure 10:
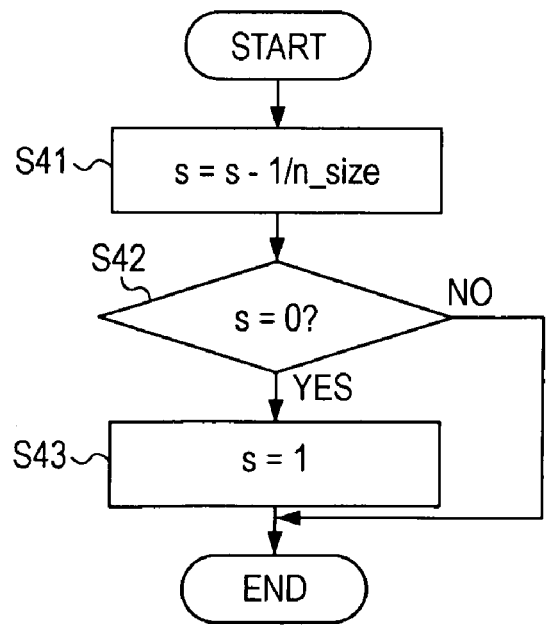
FIG. 10 is a flowchart showing a detailed processing procedure in the input window size change process performed in step S6 in the flowchart shown in FIG. 4.

FIG. 10 shows, in a flowchart, a detailed processing procedure in an input window size change process performed in step S6 in the flowchart shown in FIG. 4.

In step S5, when changing of the size of the input window is instructed via the five-input directional key, the processing procedure is started up. Then, first, (s−1)/n_size is substituted for the scale factor s (step S41).

At this point, as a result of decreasing the scale s in step S41, it is checked whether or not the scale factor s has reached 0 (step S42). When the scale factor s has reached 0, it is reset to 1 (step S43). As a result, when the set key of the five-input directional key is pressed a plurality of times (in this example, 3 or more times), the sizes of the input window are cycled through.

Up to this point, as an image drawing processing method in units of grid squares via an input window, in which changing of size and movement within the input screen is possible, an example is described in which the grid square at the position corresponding to the character input key is filled in with a predetermined drawing color. Of course, the image drawing processing method can be applied to arranging a character font and drawing an illustration as in ASCII Art.

In the latter case, first, a character or a pictogram is assigned to each of input keys. For example, a character or a pictogram used for drawing, such as an illustration, can be made to be selected via a predetermined menu screen. Furthermore, the size of each grid square is set at a pixel size corresponding to the character or the pictogram. The input window is inevitably fixed to a size for a 3×4 matrix of the grid square. Even if the set input is performed using the five-input directional key, the sizes of the grid square and the input window are not changed.

Then, when user input is performed or one of the character input keys arranged in a 3×4 matrix, the character or the pictogram assigned to the input key at which the user input has been performed is input to the grid square corresponding to the position in the 3×4 matrix at which the user input has been performed.

Figure 11:
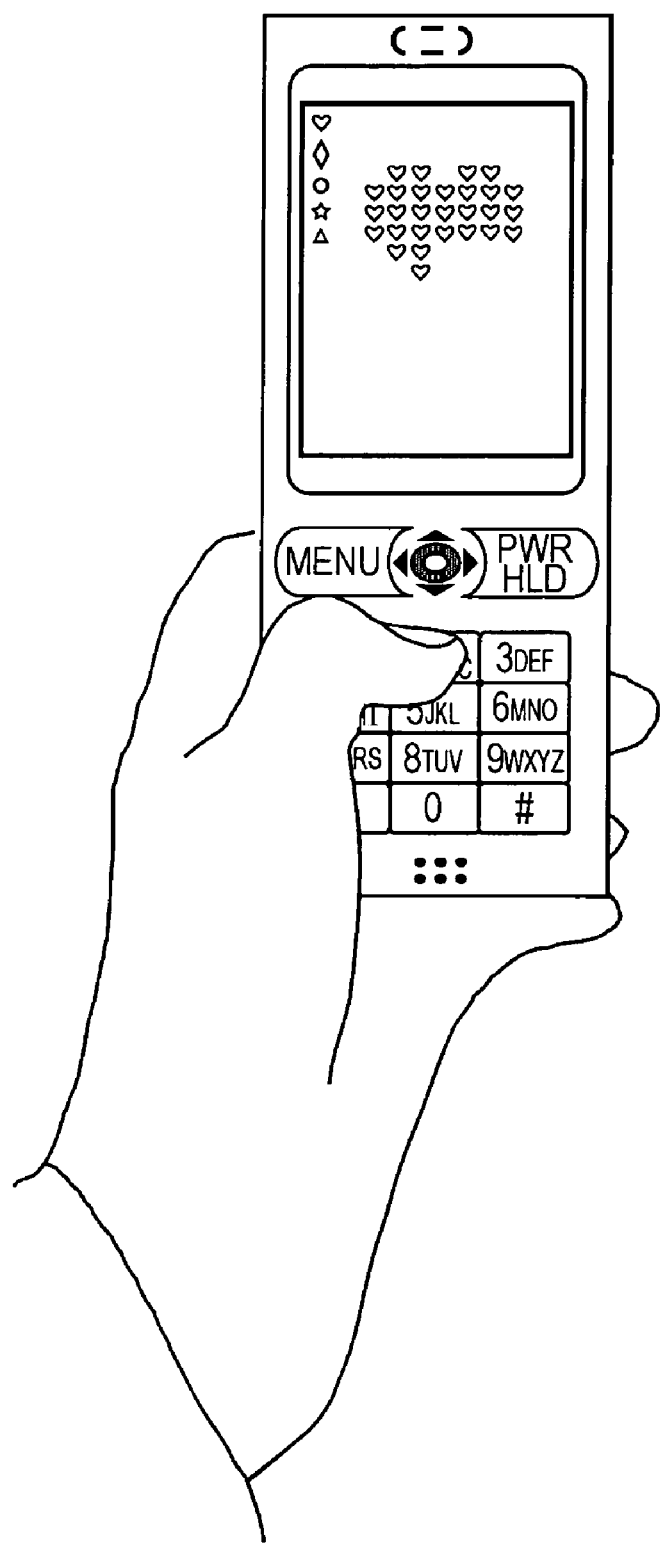
FIG. 11 shows a state in which a two-dimensional image is drawn while moving the position of the input window formed of grid squares arranged in a 3×4 matrix on the input screen of the display 140 and while specifying a grid square position on the input window by using character input keys.

FIG. 11 shows a state in which a grid square position in the input window is specified by using character input keys and a two-dimensional image of a pictogram is drawn while moving the position of the input window formed of grid squares of the 3×4 matrix on the input screen of the display 140.

Figure 12:
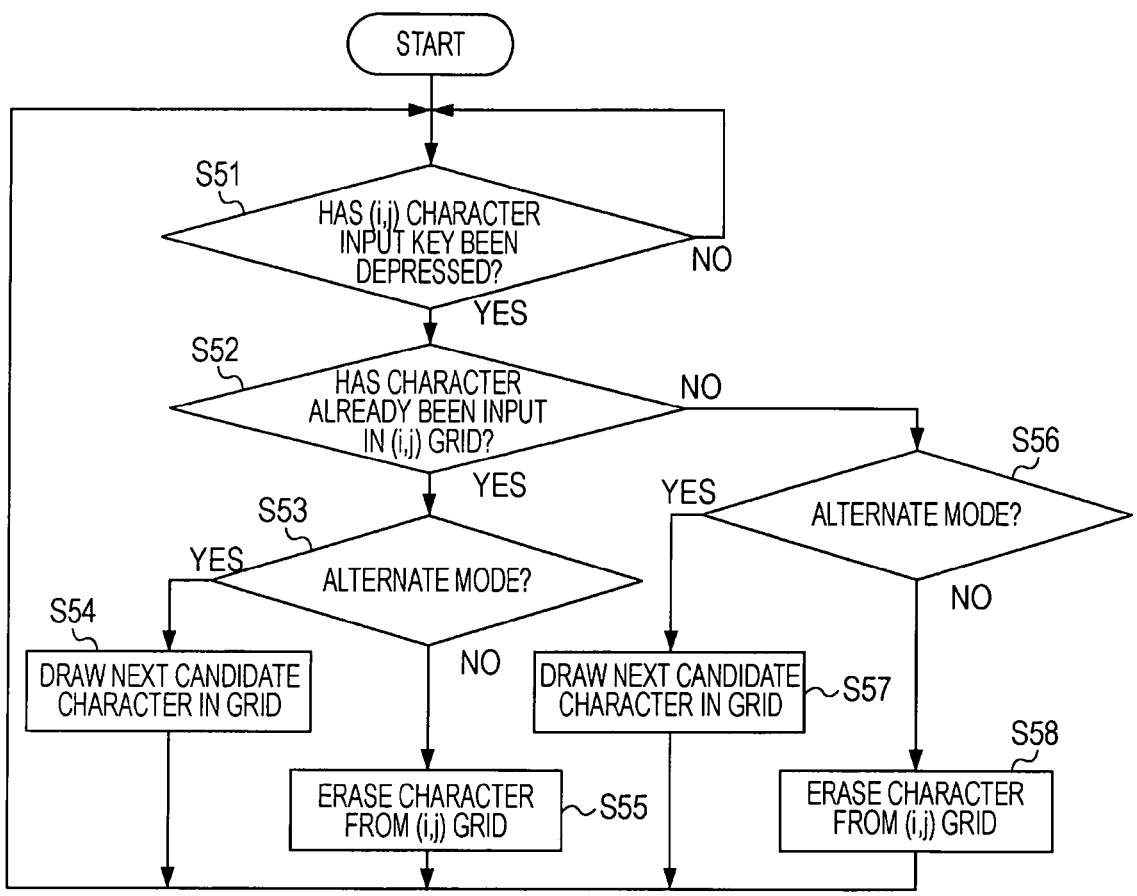
FIG. 12 is a flowchart showing a processing procedure for drawing a two-dimensional image formed of characters or pictograms by specifying a grid square position on the input window by using character input keys while moving the input window formed of grids arranged in an N×M matrix on the input screen.

FIG. 12 shows, in a flowchart, a processing procedure for specifying a grid square position in the input window by using character input keys and for drawing a two-dimensional image formed of characters or pictograms while moving the input window formed of grid squares of the N×M matrix on the input screen. However, a plurality of characters or pictograms that can be drawn in the grid square (as candidate characters) are provided. In the alternative mode, when an input of a character is instructed at the same grid square position, these candidate characters are assumed to be interchanged in sequence.

When the key at the position (i, j) from within the input key group is pressed (Yes in step S51), it is checked whether or not a character has already been drawn in the grid square at the position (i, j) within the input window (step S52).

At this point, when a character has already been drawn in the grid square at the position (i, j) within the input window (Yes in step S5), next, it is checked whether or not an alternative mode has been currently set (step S53).

Then, when the alternate mode has been set (Yes in step S53), next, a character that can be drawn is drawn in the corresponding grid square (step S54). When not in the alternate mode, the character that has already been drawn in the corresponding grid square is erased (step S55).

When a character has not been drawn in the grid square at the position (i, j) within the input window (No in step S52), next, it is checked whether or not the mode has been currently set to the alternate mode (step S56).

Then, when the mode has been set to the alternate mode (Yes in step S56), next, a character that can be drawn (candidate character) is drawn in the corresponding grid square (step S57). When the mode has not been the alternate mode, a predetermined character is drawn in the corresponding grid square (step S58).

As has been described above, according to the embodiments of the present invention, on the basis of an operation of character input keys arranged in a 3×4 matrix by the user, it is possible to suitably draw an image that substitutes for an illustration by inputting a plurality of characters (including pictograms and simple filled-in grid squares) over grid squares for several lines on the input screen of the mobile phone.

In this specification, a description has been given by focusing on embodiments in which the present invention is applied; however, the spirit and scope of the present invention are not limited to these embodiments. The present invention can be similarly applied to various information devices which include, as standard, input keys arranged in an N×M matrix pattern, a five-input directional key for accepting instruction input from a user, which include five kinds of instructions of up, down, left, and right, and set, and an input screen or applied to various information devices which are externally connected.

According to the present invention, it is possible to realize a flexible drawing operation in units of grid squares by moving an input window formed of grid squares of the N×M matrix corresponding to character input keys of the N×M matrix on an input screen and by successively performing a drawing process on the grid square corresponding to the character input key pressed by the user while changing the size of the grid square as necessary.

As described in this specification, when the present invention is applied to an information device having an Internet connection function, such as a mobile phone, it is possible to upload images drawn in units of grid squares to the Internet or conversely download them from the Internet.

In the image drawing method according to the present invention, by assuming that each grid square of an N×M matrix constituting an input window is a pixel, it is possible to draw images or illustrations in an ASCII Art style. These illustrations can be transmitted by being attached to a message of electronic mail. Furthermore, it is possible to easily draw a new character in a pictogram style, and such a character can be transmitted similarly by being attached to a message of electronic mail.

When the image drawing method according to the embodiment of the present invention is applied to, for example, a mobile phone with a digital camera shown in FIG. 1, it is possible to draw an image that substitutes for a photograph by using an input window formed of grid squares of the N×M matrix and character input keys of the N×M matrix, described above, on a photograph image captured using the digital camera. In addition, by using an image drawn by the user and by using an image as a frame for a photograph taken using a digital camera, or the like, it is possible to take a creative photograph.

According to the image drawing method according to the embodiment of the present invention, it is possible to change abatar (incarnation) used in a game inside a mobile phone, a mark indicating an individual in map and position information service, and visual symbols, such as a folder used in an interface in a mobile phone.

It should be understood by those skilled in the art that various modifications, combinations, sub-combinations and alterations may occur depending on design requirements and other factors insofar as they are within the scope of the appended claims or the equivalents thereof.

What is claimed is:

1. An image drawing method for drawing an image on an input screen of a portable terminal having input keys arranged in an N×M matrix, the image drawing method comprising the steps of:

selecting a size of an input window in response to pressing a set key, wherein the size of the input window is switched each time the set key is pressed;

selecting a position on the input screen to locate the input window;

displaying the input window of the selected size at the selected position on the input screen such that the displayed input window comprises a current drawable area divided into a grid having N×M grid squares, wherein a grid square of the current drawable area corresponds to an input key at a corresponding position in the N×M matrix; and in response to user input being performed on one of the input keys arranged in the N×M matrix, performing a drawing process at the grid square corresponding to the one of the input keys.

2. The image drawing method according to claim 1, wherein the portable terminal includes directional keys for accepting instruction inputs from a user, the directional keys including five keys of up, down, left, right, and set, in selecting the size of the input window, and in selecting the position of the input window, each time one of the up, down, left, and right keys among the directional keys is pressed, the input window is moved in a corresponding direction on the input screen.

3. The image drawing method according to claim 1, wherein, a drawing process corresponding to current image information of the grid square corresponding to the position in the N×M matrix at which the user input has been performed is performed to draw the input window.

4. The image drawing method according to claim 3, wherein the input screen has a drawing color and a background color, and when the input window is drawn, if the grid square corresponding to the position in the N×M matrix at which the user input has been performed currently has the background color, the grid square is redrawn in the drawing color, and if the grid square currently has the drawing color, the grid square is redrawn in the background color.

5. The image drawing method according to claim 3, wherein the input screen has a drawing color with a high intensity and a background color with a low intensity, and if the grid square corresponding to the position in the N×M matrix at which the user input has been performed currently has the background color, the intensity is increased by a specific ratio, and if the grid square currently has the drawing color, the intensity is decreased by a specific ratio.

6. The image drawing method according to claim 1, wherein a drawing processing method applied to draw the window is switched in response to a user operation of a predetermined key assigned to mode switching or a simultaneous operation of two or more keys having a predetermined combination.

7. The image drawing method according to claim 1, further comprising the step of assigning a character or a pictogram to each of the input keys, wherein, in selecting the input window size, a size of the input window in which each grid square has a pixel size corresponding to a character or a pictogram is selected, and in response to user input being performed on one of the input keys of the N×M matrix, a character or a pictogram assigned to the input key at which the user input has been performed is input to the grid square corresponding to the position in the N×M matrix at which the user input has been performed.

8. A portable terminal for drawing an image in units of grid squares on an input screen, the portable terminal comprising:

input keys arranged in an N×M matrix;

directional keys configured to accept instruction inputs from a user, the directional keys including five keys of up, down, left, and right directions, and set;

an input screen; and a microprocessor for performing the steps comprising:

determining a size of an input window in response to a pressing of the set key among the directional keys, wherein the size of the input window is switched each time the set key is pressed;

determining a position of the input window on the input screen in response to a pressing of the up, down, left, and right keys among the directional keys;

displaying the input window of the size determined by the microprocessor at the position on the input screen determined by the microprocessor, such that the displayed input window comprises a current drawable area divided into a grid having N×M grid squares, wherein a grid square of the current drawable area corresponds to an input key at a corresponding position in the N×M matrix; and in response to user input being performed on one of the input keys of the N×M matrix, performing a drawing process at the grid square corresponding to the one of the input keys.

9. The portable terminal according to claim 8, wherein the microprocessor performs a drawing process corresponding to current image information of the grid square corresponding to the position in the N×M matrix at which the user input has been performed.

10. The portable terminal according to claim 9, wherein the input screen has a drawing color and a background color, and if the grid square corresponding to the position in the N×M matrix at which the user input has been performed currently has the background color, microprocessor redraws the grid square in the drawing color, and if the grid square currently has the drawing color, the input window drawing means redraws the grid square in the background color.

11. The portable terminal according to claim 9, wherein the input screen has a drawing color with a high intensity and a background color with a low intensity, and if the grid square corresponding to the position in the N×M matrix at which the user input has been performed currently has the background color, the microprocessor increases the intensity by a predetermined ratio, and if the grid square currently has the drawing color, the microprocessor decreases the intensity by a specific ratio.

12. The portable terminal according to claim 8, wherein the microprocessor switches a drawing processing method to be applied in response to a user operation of a predetermined key assigned to mode switching or a simultaneous operation of two or more keys having a predetermined combination.

13. The portable terminal according to claim 8, further comprising key assignment means for assigning a character or a pictogram to each of the input keys, wherein a size of each grid square of the input window is fixed to a pixel size corresponding to a character or a pictogram, and in response to user input being performed on one of input keys of the N×M matrix, the microprocessor inputs a character and a pictogram assigned to the input key at which the user input has been performed to the grid square corresponding to the position in the N×M matrix at which the user input has been performed.

14. A non-transitory computer-readable medium, which stores a set of instructions that when executed by a microprocessor performs a method for drawing an image on an input screen of a portable terminal having input keys arranged in an N×M matrix, the method comprising the steps of:

selecting a size of an input window in response to pressing a set key, wherein the size of the input window is switched each time the set key is pressed;

selecting a position on the input screen to locate the input window;

displaying the input window of the selected size at the selected position on the input screen, such that the displayed input window comprises a current drawable area divided into a grid having N×M grid squares, wherein a grid square of the current drawable area corresponds to an input key at a corresponding position in the N×M matrix; and in response to user input being performed on one of the input keys arranged in the N×M matrix, performing a drawing process at the grid square corresponding to the one of the input keys.

15. A portable terminal for drawing an image in units of grid squares on an input screen, the portable terminal comprising:

input keys arranged in an N×M matrix;

directional keys configured to accept instruction inputs from a user, the directional keys including five keys of up, down, left, and right directions, and set;

an input screen;

an input window size determination unit configured to determine a size of an input window in response to pressing a set key, wherein the size of the input window is switched each time the set key is pressed;

an input window position determination unit configured to determine a position of the input window on the input screen in response to a pressing of the up, down, left, and right keys among the directional keys;

an input window display unit configured to display the input window of the size determined by the input window size determination unit at a position on the input screen determined by the input window position determination unit, such that the displayed input window comprises a current drawable area divided into a grid having N×M grid squares, wherein a grid square of the current drawable area corresponds to an input key at a corresponding position in the N×M matrix; and an input window drawing unit, which in response to user input being performed on one of the input keys of the N×M matrix, performs a drawing process at the grid square corresponding to the one of the input keys.

* * * * *